(No Model.) 4 Sheets—Sheet 1.
W. R. MARSHALL.
PNEUMATIC DUST COLLECTING SYSTEM.
No. 550,796. Patented Dec. 3, 1895.
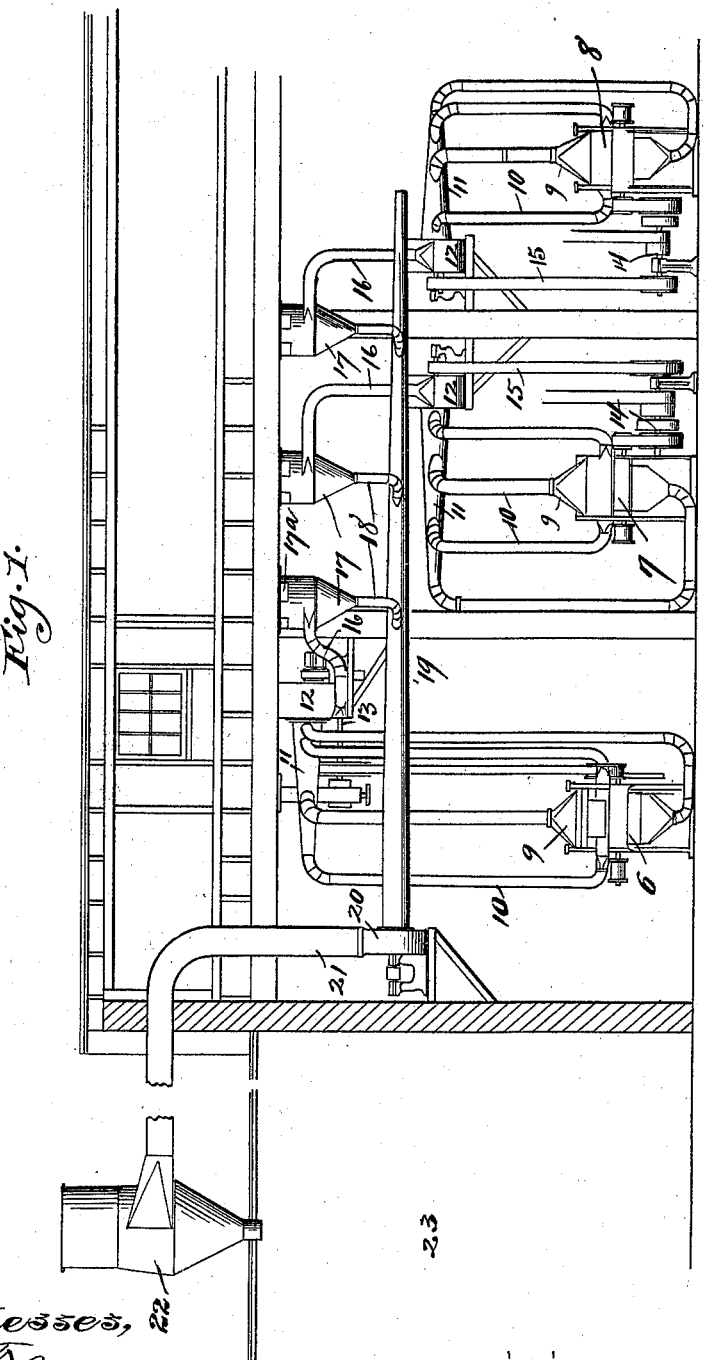

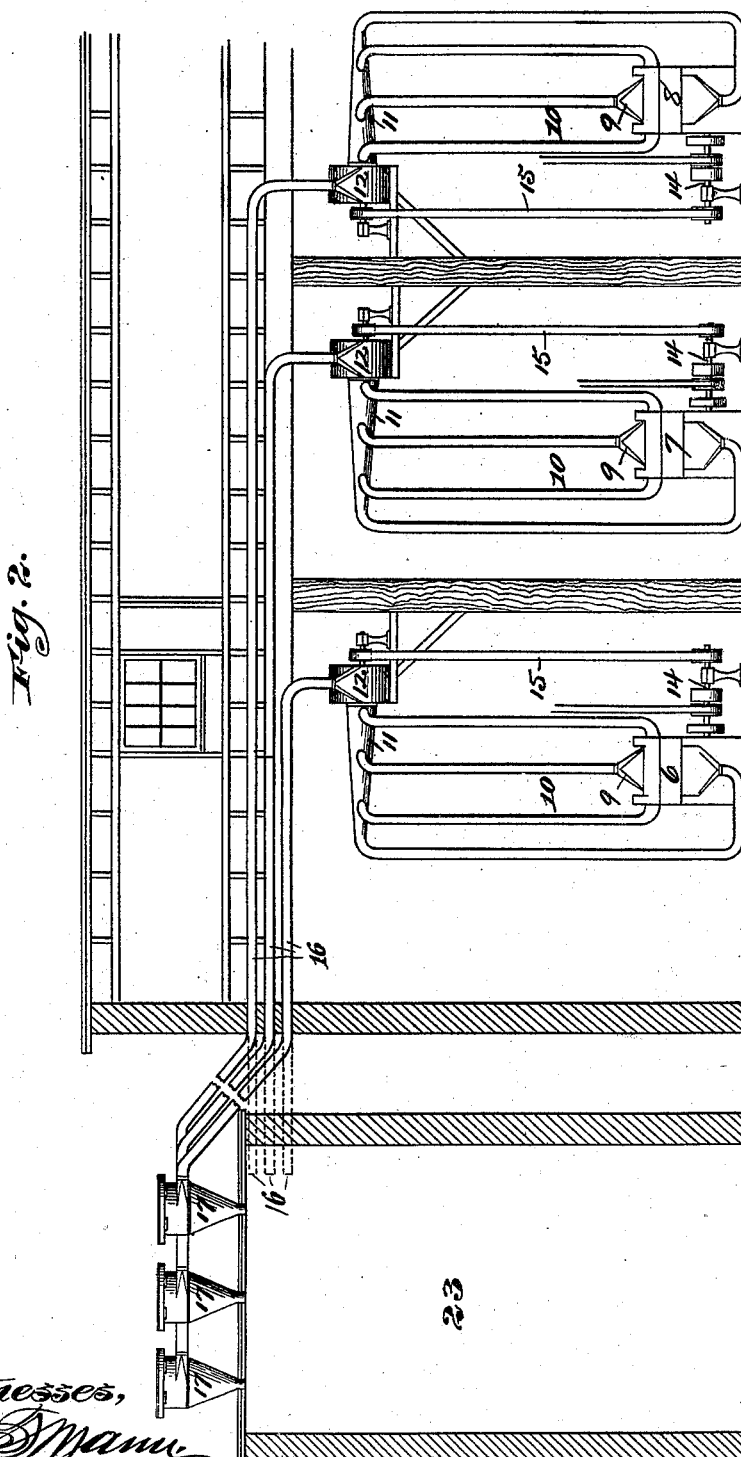

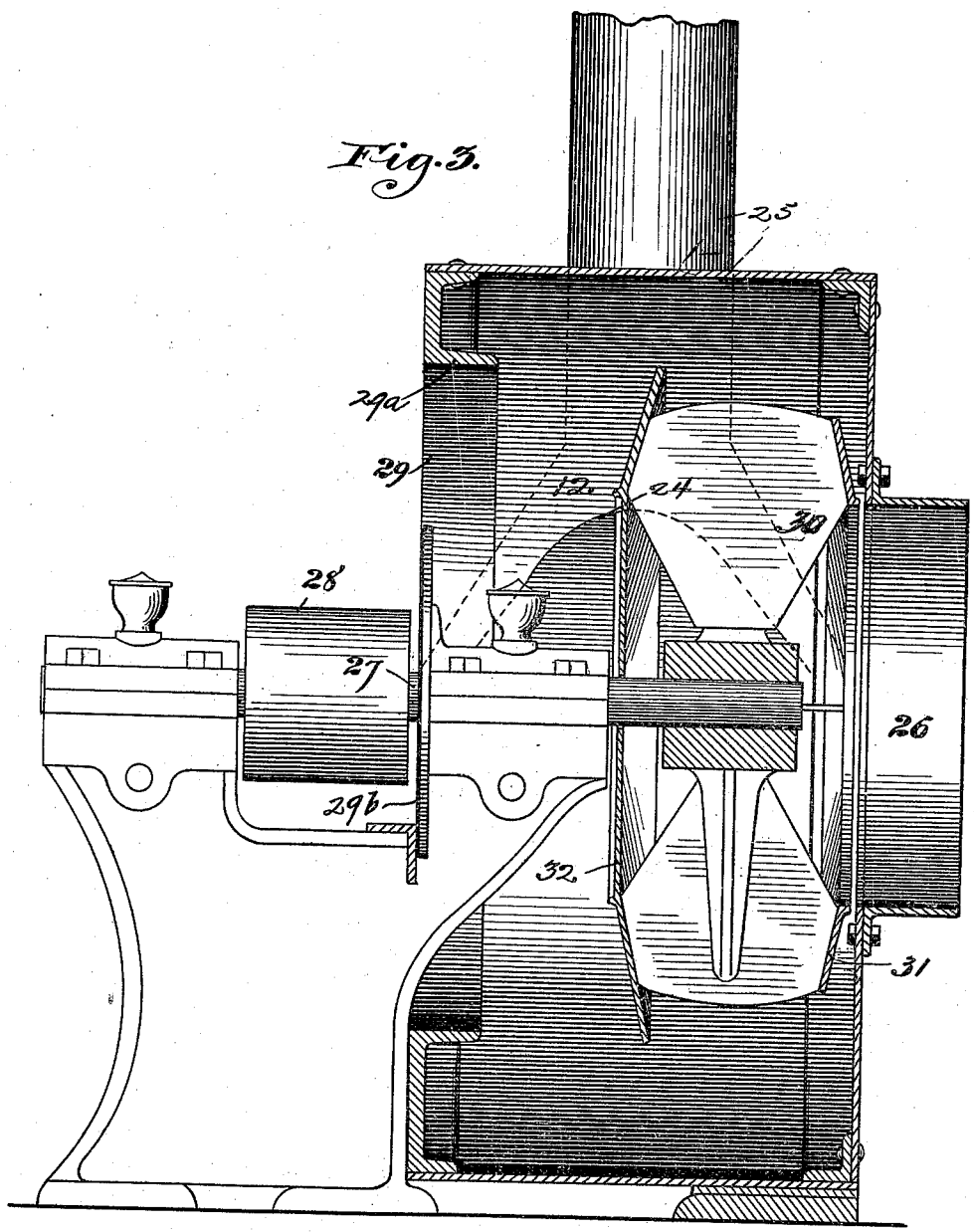

(No Model.) 4 Sheets—Sheet 4.
W. R. MARSHALL.
PNEUMATIC DUST COLLECTING SYSTEM.
No. 550,796. Patented Dec. 3, 1895.
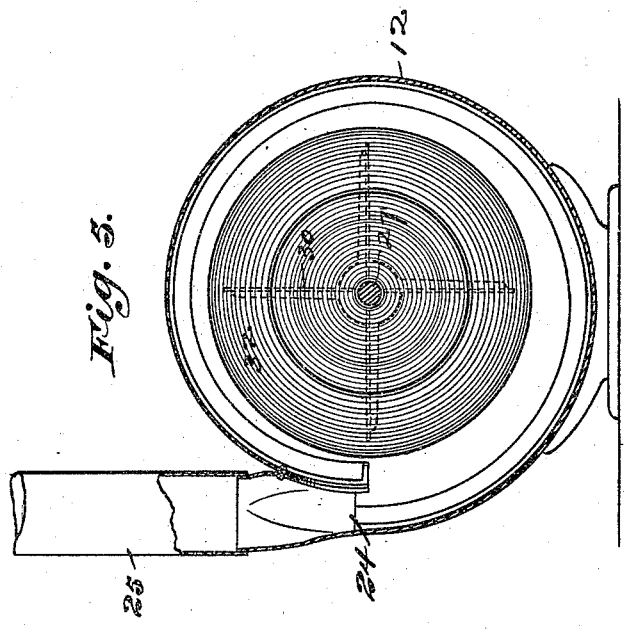
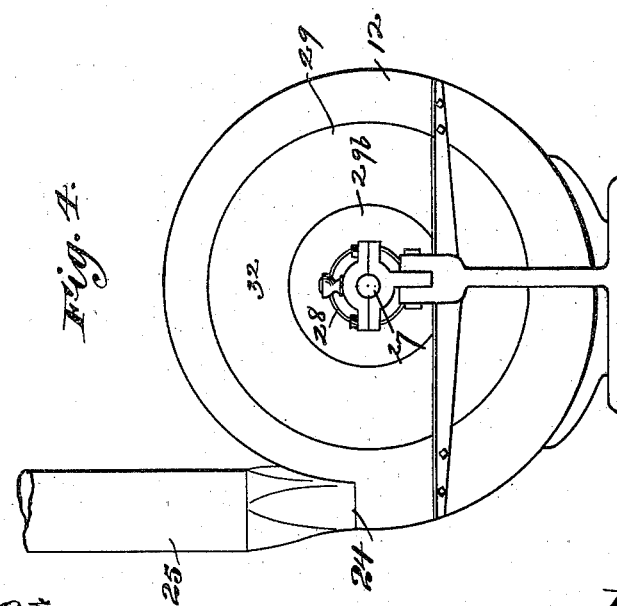
Witnesses,
Inventor,
William R. Marshall,

UNITED STATES PATENT OFFICE.

WILLIAM R. MARSHALL, OF EAST SAGINAW, MICHIGAN.

PNEUMATIC DUST-COLLECTING SYSTEM.

SPECIFICATION forming part of Letters Patent No. 550,796, dated December 3, 1895.

Application filed May 21, 1895. Serial No. 550,159. (No model.)

*To all whom it may concern:*

Be it known that I, WILLIAM R. MARSHALL, of East Saginaw, Michigan, have invented certain new and useful Improvements in Pneumatic Dust-Collecting Systems, of which the following is a specification.

This invention relates to a system of collecting and conveying dust and other waste materials from one place to another by means of an air-current.

As my invention is intended for use in connection with the collecting and conveying of dust or shavings in woodworking and other dust-producing factories of all classes, I will first describe the common type of apparatus at present employed for such purpose and thereby render more clear of apprehension the improvements which form the subject-matter of my invention. In collecting and conveying dust or shavings in such factories by means of air-currents the practice has been to employ hoods, which are placed over each dust-producing machine or cutter-head, and from the apex of each hood a small branch pipe leads to a main suction-pipe, the area of which is proportioned to the combined area of the several branch pipes delivering into such main. This main suction-pipe is connected to the suction-inlet, of at least equal area, of the centrifugal exhaust-fan, and all the dust and waste received through the branch pipes from the several machines pass through the fan and are discharged from an opening in its periphery of an area about equal to that of the suction-inlet. A discharge-pipe of an area in cross-section equal to that of the main suction-pipe is connected to the discharge-outlet from the fan and leads to a centrifugal dust-collector placed over a dust-vault or connected to a furnace-feeder. The air-current in the discharge-pipe is compressed by action of the fan, and this compression must be several ounces greater than atmospheric pressure and so maintained in order to convey the solid matter through the discharge-pipe, and it is obvious that the volume of air which supplies the discharge-pipe cannot be cut off from the suction of the fan, so as to reduce the velocity of the air-current in the discharge-pipe, as thereby the dust particles could not be carried in suspension and would settle on the bottom of the discharge-pipe and gradually fill it.

The power required to drive the fan is proportional to the volume and velocity of air-current propelled through the discharge-pipe. It is therefore obvious that if a portion of the air now supplied to the suction-inlet of the fan can be cut off, without reducing the velocity of the current in the discharge-pipe from the fan, so low that the dust particles will not be held in suspension a saving of power may be effected.

The practice has been to supply all or most of the small branch pipes with "cut-offs" or "blast-gates," so called, so that when any of the machines are not running the branch pipes leading therefrom may be closed; but it is found in practice that only a small proportion of the branch pipes may be closed at one time, because if too much air is cut off from the fan in this way the discharge-pipe will not receive a sufficient volume of air to hold the dust particles in suspension. The result of shutting off some of the branch pipes in this manner would appear to be a cutting off of such proportional amount of air supplied to the suction-inlet of the fan; but this is not the fact. So long as the necessary volume and velocity of current is maintained in the discharge-pipe the volume of air necessary will be supplied through the small branch pipes that still remain open, and thus the cutting off of some pipes does not in practice operate to materially economize power.

The general practice is to employ in a common factory one large fan, to the suction-pipe of which are connected as many dust-producing machines as the fan is capable of caring for, and in such common practice the fan is run at the required speed constantly, even if one or more of the dust-producing machines attached to it are doing no work, and it often happens that the power consumed in driving the fan is greater than the power required to drive all the dust-producing machines in actual operation.

Another fact which it is important to understand is that fans of large diameter require, in proportion to their capacity of inducing an air-current of high velocity, much more power than fans of small diameter.

From the foregoing it is obvious that if each large dust-producing machine in a factory could be supplied practically with its own small individual fan and system of pipes, so that when such dust-producing machine is idle its fan is also idle, or in cases where small dust-producing machines are employed such machines being connected in sets, if each set or system of machines can have its small individual fan and piping system, so that when idle, or if all the small machines except one in a set be idle that are connected with one small fan, all of the pipes can be closed except one, thus shutting off five-sixths of the volume of the air supplied to the suction of the fan without affecting the carrying capacity of the remaining portion of the air through the discharge-pipe, the fan is idle, and if the dust or waste from such individual systems be concentrated and delivered into a fan of sufficient capacity to carry the aggregate volume of dust and waste to the desired point by employing automatically just a sufficient volume of air to hold the concentrated material in suspension in the discharge-pipe, a large saving of power, space, and cost over what would be required to handle all of the dust by the single large fan, which under present arrangements is required to run at its full capacity all of the time, can be effected.

No fan or system has been provided prior to my invention which could be applied practically in the manner above indicated. The known forms of fans are inapplicable for the reason, chiefly, that as constructed they require to deliver the whole volume of air through the discharge-outlet which they receive at the suction-inlet, and therefore the discharge-pipe has to be at least as large as the main suction-pipe. Besides, the dust-collectors, piping, and fans necessary to run each machine or group of small machines independently would require too much space and entail a much larger expense for installation and maintenance than the present old methods.

The known forms of fan dust-collectors are unsuitable, principally for the reason that they are not constructed with a view of either inducing a minus-pressure current of high velocity with economy or the delivery of a volume of concentrated dust to a distant point through a discharge-pipe with an air-current of plus pressure and high velocity.

The object of this invention, therefore, is to provide a new system wherein all of the essential features of the older systems are preserved and the dust is collected and conveyed by the air-currents and separated therefrom at a great saving of power and cost of installation and maintenance as well as saving of space.

I do not wish to claim in this application the construction of the fan-concentrator *per se* or any other improvement in the fan-concentrator or pneumatic system herein described and shown except the improvements specifically pointed out in the claims, and reserve the right to claim all other improvements in my pending application, Serial No. 553,505, filed June 21, 1895.

In the accompanying drawings, Figure 1 shows an arrangement of the apparatus wherein a number of small dust-collectors are suspended from the ceiling of a factory and deliver the dust into a suction-pipe connected with an exhaust-fan, by which it is discharged into a larger dust-collector indicated as placed over the roof of a shavings-vault at some distance from the exterior wall of the factory. Fig. 2 shows a typical arrangement wherein each dust-fan or concentrator delivers to a small dust-collector placed on the roof of the vault or may deliver directly to the vault, as indicated in dotted lines. Fig. 3 is a transverse sectional elevation of my improved fan, and Figs. 4 and 5 are respectively a side elevation and longitudinal section of the fan.

Referring to the arrangement shown in Fig. 1 of the drawings, 6, 7, and 8 represent woodworking-machines, each having four cutter-heads and each provided with four hoods, as 9, from which lead small branch pipes 10, each supplied with a blast-gate or cut-off, each group of branch pipes delivering into a fan suction-pipe 11, the fans being indicated at 12. The fan may be driven from a line-shaft 13; or each fan may be driven directly from a counter-shaft 14 by the belt 15 and shipper mechanism employed, so that when the machine is thrown out of gear the fan will stop running. Each fan delivers by a discharge-pipe 16 into a small dust-collector 17, suspended, as shown in this arrangement, from the ceiling of the factory. The several dust-collectors 17 have their dust-outlets connected by small pipes 18 with a trunk or suction-pipe 19, leading to the eye of an ordinary centrifugal exhaust-fan 20, of just sufficient capacity to carry the concentrated material. A discharge-pipe 21 leads from the fan to a dust-collector 22, shown as arranged over a dust and shavings vault 23. The break in the discharge-pipe 21 and in the roof of the shavings-vault 23 indicates that the collector 22 is placed at some distance from the factory, and in many instances that is necessary. Briefly describing the operation of this system, the dust and shavings and waste from the woodworking-machines 6 7 8 are drawn through the suction-pipes 10 and delivered into the eye of the fan 12, where the solid particles carried in the air-current are driven to the periphery of the fan-case by the action of the fan, wheel, or blades and escape through the periphery of the fan into the small discharge-pipes 16, from whence the solid matters are discharged into the small dust-collectors 17. The fan is so constructed, as will be hereinafter more fully described, that when the inlet is fully open the larger proportion of the air escapes from the fan practically freed from dust and is delivered back into the factory, while the whole of the dust and waste is delivered, with a small proportion of the air-current, into the small dust-collector 17. A further separation of the air and solid matter will take place in this dust-collector, which is or may be of the well-known centrifugal type, and the purified air may escape through the opening 17ª, while the separated dust discharges from the tip of the conical part of the collector through the small discharge-pipes 18 into the suction main 19, and the accumulated dust is drawn into the eye of the fan 20 and discharged thence through the pipe 21 into the collector 22, where practically a final and complete separation of the air and dust is effected, the air escaping at the top of the collector and the dust into the vault 23.

In the arrangement shown in Fig. 2 of the drawings, instead of placing the dust-collectors 17 within the factory they may be placed upon the roof of the vault 23 when the latter is arranged close to the factory, and the fan discharge-pipes 16 in this case are extended to the collectors 17, which discharge directly into the shavings-vault, the suction-pipe 19, fan 20, discharge-pipe 21, and large dust-collector 22 being dispensed with, or the discharge-pipe 16 may discharge directly into the vault 23, as indicated in dotted lines. The arrangement shown in Fig. 2 will be found available and probably preferable in all cases where the distance between the shavings-vault and the fan is not too great. Each fan will be capable of delivering its dust for a distance of, say, one hundred to one hundred and fifty feet; but for greater distance it is preferred to use the arrangement in Fig. 1 of the drawings.

The illustrations are intended to represent merely typical arrangements, and other variations may be made—as, for example, the suction-pipes 10 may lead to four machines each having one cutter-head, and where small machinery is employed it will probably be preferable to arrange the machinery in sets and provide each set of small machines with its fan-concentrator.

I will now proceed to describe more particularly the construction of the fan itself, and, referring to Figs. 3, 4, and 5, 12 represents the fan-casing, which is substantially cylindrical in form and has a small peripheral outlet 24, to which is connected a discharge-pipe 25. 26 represents the suction-inlet, 27 the fan-shaft, and 28 its driving-pulley. At some point in the casing of the fan, and preferably in the side opposite the suction-inlet, an opening is formed for the escape of the surplus air. As shown in Fig. 3, this opening (indicated at 29) is concentric to the fan-shaft and is larger in diameter than the fan-wheel. The air-discharge opening is preferably surrounded by a flange 29ª, which constitutes a guard, serving to arrest those dust particles which are traveling with the air-current in contact with the periphery of the casing and preventing their being carried out of the fan with the air-current escaping through the opening 29. There is also provided concentric to the shaft a disk 29$^b$.

It is obvious that a number of openings may be substituted for the one continuous annular opening 29.

The fan-blades 30 are braced by the diaphragm-plates 31 32. By their rapid rotation the dust-laden air-current is given a rotary movement as soon as it enters the fan-chamber. Acting under the law of centrifugal force the heavier particles carried in this current are thrown to the periphery of the fan-case and traveling around the chamber escape through the outlet 24 into the pipe 25. The surplus air being specifically lighter freed of these particles and seeking to escape flows over the edge of the diaphragm-plate 32 and issues through the large discharge-opening 29. The air will escape from the fan in an annular column and with a whirling motion, the main volume of air escaping close to the outer edge of the opening. The action of this whirling motion of the escaping air will cause a partial vacuum within the fan-chamber, and this would tend to induce a current of air to enter through the discharge-opening. Disk 29$^b$ prevents the formation of this induced current.

With a fan of the proportions shown the greater portion of the air escapes through the opening 29, and practical tests have shown that as much as five-sixths of the entire volume of air can be discharged practically purified through this opening in the fan-case. Consequently the dust-laden air-current will be reduced to one-sixth of the entire volume, and this remaining one-sixth will contain all of the dust and waste.

It is obvious that as only one-sixth of the entire volume of air which the fan is capable of receiving through its suction-inlet is utilized in carrying the concentrated dust through the small discharge-pipe five-sixths of all machines connected to the suction-inlet of this fan may be cut off by blast-gates and still enough air be supplied to the fan to carry all of the dust through the discharge-pipe, as it is found in practice that no air escapes through the side outlet 29 of the fan except the surplus air received into the fan, which cannot be discharged through the discharge-pipe by reason of its area being so much less than the area of the suction-inlet of the fan. This dust-laden air-current being discharged into the small dust-collector 17, as in the arrangement shown in Fig. 1, will under the action of the blast whirl about in the dust-collector and substantially all of the air in which it is borne will be separated from the dust and waste and the latter will discharge into the suction-pipe, through which it is drawn by the fan 20, and ultimately be delivered into the large collector 22, and thence to the shavings-vault.

In the arrangement shown in Fig. 2 the fan is of sufficient power to force the concentrated dust and waste into the vault or to the small collector 17, in which the remaining body of air will be freed from the dust and escape into the atmosphere, and, finally, five-sixths of the area of the pipes connected to the suction-inlet of the fan can be closed by blast-gates and still enough air be supplied to the fan to supply the discharge-pipe from the fan, and thus a large saving of power effected.

I claim—

1. A pneumatic dust collecting system, comprising in combination a fan concentrator, a suction pipe connected to the inlet of the fan concentrator, the latter having an outlet in its peripheral wall for the concentrated dust and its carrying current and a separate outlet in the side of the fan case for the surplus air, a dust collector, and a discharge pipe connecting the dust collector with the dust discharge of the fan concentrator, said discharge pipe being much smaller than the fan inlet but of sufficient area to convey the concentrated dust and its carrying current while the surplus air purified from dust escapes from the fan concentrator through the surplus air outlet, substantially as shown and described.

2. A pneumatic dust collecting system, comprising in combination a fan concentrator, suction pipes supplied with blast gates connected to the inlet of the fan concentrator, the latter having an outlet for the concentrated dust and its carrying current and a separate outlet for the surplus air, a dust collector, and a discharge pipe connecting the dust collector with the dust discharge of the fan concentrator, said discharge pipe being much smaller than the fan inlet but of sufficient area to convey the concentrated dust and its carrying current while the surplus air which is taken into the fan when an excess of inlet over dust outlet is opened is practically purified from dust and escapes from the fan concentrator through the surplus air outlet, substantially as described.

3. A pneumatic dust collecting system, comprising in combination a plurality of fan concentrators, a plurality of suction pipes connected to the inlets of the fan concentrators, the latter having peripheral outlets for the concentrated dust and its carrying current and separate outlets in their side walls for the surplus air, a plurality of dust collectors, and a plurality of discharge pipes connecting the dust collectors with the dust discharges of the fan concentrators, said discharge pipes being much smaller than the fan inlets but of sufficient area to convey the concentrated dust and its carrying current, while the surplus air purified from dust escapes from the fan concentrators through the surplus air outlets, and a main suction pipe for receiving the separated dust from the dust collectors, an exhaust fan connected at its inlet to the main suction pipe, said fan being connected at its outlet with a discharge pipe for conveying the concentrated and collected dust to a distance, substantially as shown and described.

WILLIAM R. MARSHALL.

Witnesses:
J. C. AMES,
G. M. REYNOLDS.